Aug. 24, 1926.
G. A. HANSEN
1,596,967
MACHINE FOR MARKING OR CANCELING LETTERS AND OTHER POSTAL MATTERS
Filed June 26, 1925　　2 Sheets-Sheet 1
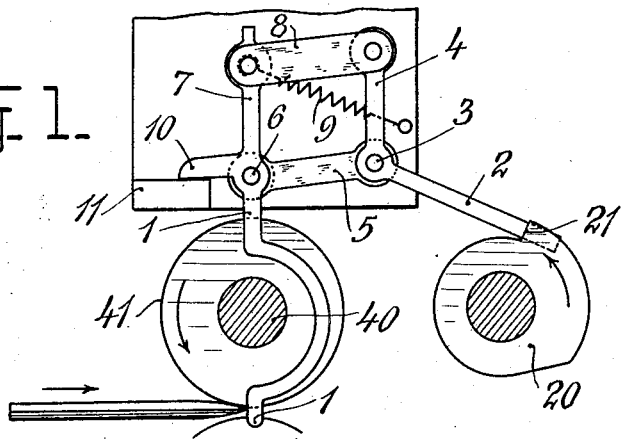
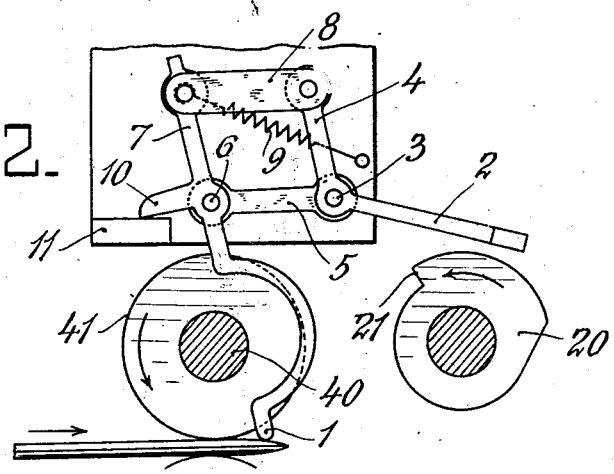
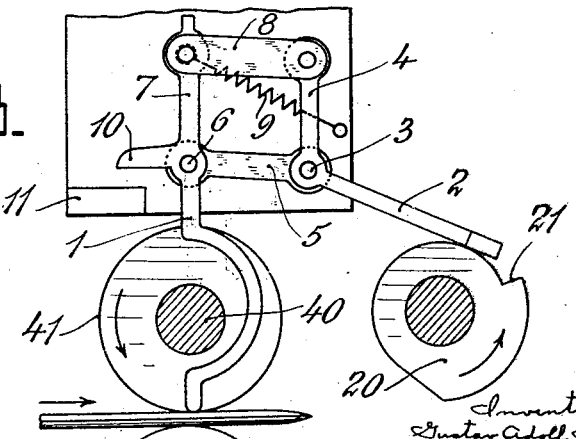

Aug. 24, 1926.
G. A. HANSEN
1,596,967
MACHINE FOR MARKING OR CANCELING LETTERS AND OTHER POSTAL MATTERS
Filed June 26, 1925    2 Sheets-Sheet 2
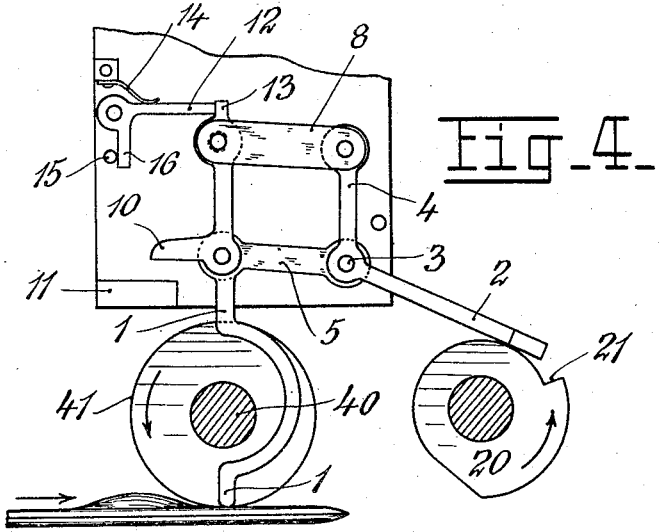
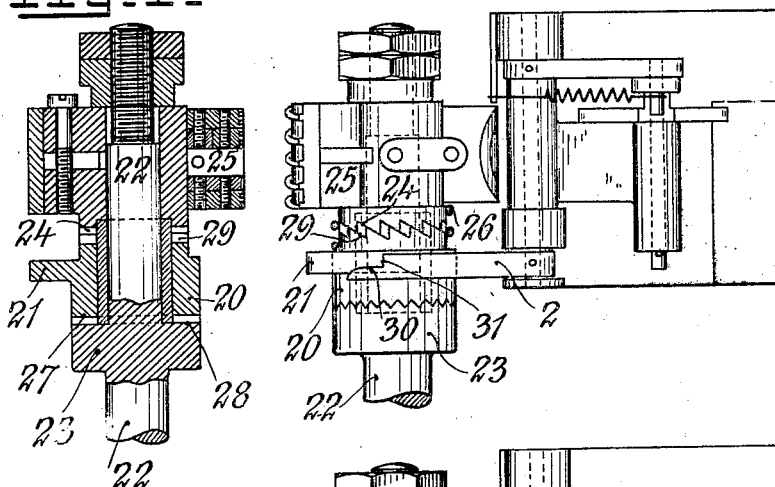
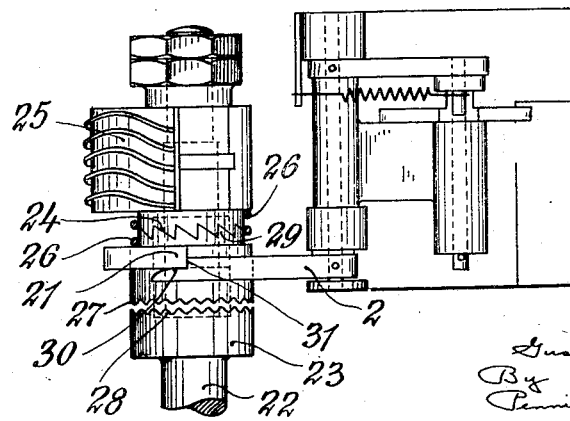

Patented Aug. 24, 1926.

1,596,967

UNITED STATES PATENT OFFICE.

GUSTAV ADOLF HANSEN, OF OSLO, NORWAY.

MACHINE FOR MARKING OR CANCELING LETTERS AND OTHER POSTAL MATTERS.

Application filed June 26, 1925, Serial No. 39,713, and in England September 1, 1924.

My invention relates to post marking machines of the class in which the stamping device operates so as to mark only so much of the letter as is necessary for canceling the stamp so that the remainder of the letter is left untouched.

The invention has for its object to improve and simplify the means for controlling the post-marking roller which in this machine as in many earlier constructions only makes one revolution for each letter passing the stamping device and is then arrested until the next letter is in position for being marked.

I have described in my patent application Ser. No. 655,182 of August 2nd, 1923, devices for this purpose comprising the arrangement of an automatic clutch for coupling the post marking roller to the constantly rotating driving shaft, and of a stop-lever and releasing device put in action by means of an arm (which I will hereinafter call the "feeler") projecting into the path of the letters.

The present invention comprises the same devices and has especially for its object to improve the arrangement and manner of action of the said feeler. The latter is in this instance in the form of an arm, which is not only capable of a swinging movement, but also of a movement in its own longitudinal direction for the purpose of obtaining a higher degree of accuracy in action, as hereinafter more specifically described. By this arrangement the number of parts necessary for performing the stopping and releasing of the stamping roller is greatly reduced. This improved feeler arrangement may be used in connection with a clutch-device substantially as described in my said prior patent specification, but I prefer to make use of the clutch device described and shown in this specification because the latter requires a much shorter axial movement of the movable clutch part than the former construction.

In the accompanying drawings, I have shown one form of carrying out the invention.

Figures 1-4 show the feeler mechanism.

Figures 1, 2 and 3 are diagrams (in horizontal projection) showing the parts in three successive positions during the operation whereby the stamping roller is released and again stopped.

Figure 4 shows the parts in the same position as in Figure 3, but includes a device not shown in Figures 1 to 3 and which serves to prevent a restarting of the roller from being caused by an object enclosed in the letter and pushing on the feeler after it has assumed the position shown in Figure 3.

Figures 5 and 6 are side views showing the stopping arm and the clutch part with which it co-operates.

In Figure 5 the parts are shown in their position during the rotation of the stamping roller.

In Figure 6 the parts are shown in their position after the stamping roller has come to rest.

Figure 7 is an axial sectional view of the stamping roller and clutch device on the driving shaft.

Referring to Figures 1-4 I shall now first describe the feeler device and its operation.

Figure 1 shows the position of the parts at the moment that a letter reaches the end of the feeler arm 1.

Figure 2 shows the position of the parts at the moment that the end of the feeler arm slips over the edge of the letter as this is passing forwards.

Figure 3 shows the position of the parts during the stamping operation of the machine. 2 is the clutch stopping arm. It will be seen that in Figure 2 this arm is lifted out of the way of the clutch disc 20, whereas in Figure 1 and Figure 3 said stop arm 2 has a position so as to be able to engage the shoulder 21 on the said disc.

The feeler arm 1 is connected with the stop arm 2 in such manner that the feeler arm can move longitudinally of itself without moving the stop arm. It can, however, also swing and by this movement it will swing the stop arm as seen in Figure 2. This double movement of the feeler can be effected in many ways. I have shown in the drawing, what I think is the simplest way of connecting these two arms and this is done in the following manner:

3 is the fulcrum of the stop arm 2 and this fulcrum has its bearing in the frame of the machine. On the same fulcrum an arm 5 swings freely. At its outer end the arm 5 carries a pin 6 and this pin is a fulcrum for the feeler arm 1. The latter is at its free end bent as shown so as not to collide with the shaft 40 of the feeding disc 41. Its other end 7 is connected by means of a link 8 with an arm 4 which is in one piece with the stop arm 2. 9 is a spring by means of which the parts are normally held in the position shown in Figure 1. To prevent this spring from pressing the feeler arm 1 too far in the direction of the feeding roller, a lug 10 is arranged laterally on the feeler arm near its fulcrum and this lug bears against a lug 11 on the frame.

The action of these parts will be as follows:

When a letter is pressed against the feeler arm 1 as shown, in Figure 1, it will swing the feeler arm so that it will take the position about as shown in Figure 2. When the feeler arm 1 swings, the lug 10 will cause the feeler arm to be somewhat moved back from the letter, thereby facilitating the slipping of such feeler over the edge of the letter. The spring will thereupon bring the parts to the position shown in Figure 3, in which position the stop arm 2 is again in a position so that it will abut against the shoulder 21 on the clutch disc 20 when it continues its movement in the direction of the arrow.

It may happen that a key or some other object is enclosed in a letter. If this should be the case, the result might be if the arrangement was as shown in these three figures now described, that the feed lever would again be swung to the position shown in Figure 2 and the stop arm 2 would then again be lifted and the clutch disc would be able to continue its movement, so that the stamping roller would make at least two revolutions. To prevent this, an arrangement may be used as shown in Figure 4, in which the parts are shown in the same position as in Figure 3. The device consists of a bell crank lever, one arm of which 12 projects against the end of the feeler arm, which latter has a projection 13 outside of the link 8. A spring 14 holds the bell crank lever in the position shown on the frame there being a pin 15, against which the other arm 16 of the bell crank lever is held by the spring. It will be seen that when the feeler lever moves from the position Figure 1 to the position Figure 3, the projection 13 will engage the arm 12, lift it a little and then slip over its end and take the position as shown in Figure 4. If now an obstacle in the letter, such as is indicated in Figure 4, presses the end of the feeler lever, the latter is prevented from a swinging motion by the arm 12 and the result will be that the feeler lever will only be pressed somewhat in its longitudinal direction, leaving the stop arm 2 in the position already attained.

It will be apparent that the feeler lever 1 instead of having its fulcrum 6 arranged in an arm 5 can be connected with the frame of the machine, as for example, by means of a pin projecting into a slot in the frame, thus allowing the feeler arm to move longitudinally and also to perform a swinging movement.

I shall now describe the clutch device and its cooperation with the stop arm just described.

Referring to Figures 5 and 6, Figure 5 shows the parts in the position when the stamping roller is in rotation whereas Figure 6 shows the parts when the stamping roller has come to rest. 20 designates the clutch disc which is placed on the stamping roller shaft 22 between a flange 23 on the same and the lower face of the stamping roller, which is marked 25. The manner in which these parts are disposed on the driving shaft is shown in Figure 7. It will be seen from these three figures that the clutch disc 20 carrying the stop lug 21 is capable of a small axial movement, a spring 26 inserted between the clutch disc (and secured with one end to the same) and the stamping roller pressing the clutch disc downwards and also imparting to it a rotary movement. The lower face of the said disc has teeth 27 corresponding with similar teeth 28 on the flange on the driving spindle. The upper face of the clutch disc has also teeth 29, one side of which is vertical, the other side being however helical or wedge shaped. These teeth correspond with similarly formed teeth 24 on the bottom face of the stamp roller. The axial length of the clutch disc from the tip of the teeth on the lower face to the tip of the teeth on the top face is a little less than the axial distance from the root of the teeth on the flange 23 to the root of the teeth on the bottom face of the stamp roller. But this difference is not so great that it is possible to rotate the clutch disc so much that the teeth 24 and 29 can pass each other. It will therefore be seen that in the position Figure 5 when the shaft 22 rotates, it will drive the stamping roller 25 through the clutch disc 20. In the position Figure 6 however the shaft 22 rotates without driving the stamping roller because the teeth 27 and 28 are not in engagement. The stop arm 2 has on its outer end an offset 30 so that a shoulder 31 is formed. This offset has a sloping surface as shown and the position of the arm relatively to the clutch disc and its lug 21 in the vertical direction is such, that when in the position shown in Figure 5, the clutch disc reaches the stop arm, it will slide upwards on the offset 30, so that it will be lifted to the position shown in Figure 6. It will therefore be seen that the stop arm not only serves to stop the clutch disc, but also at the same time releases the coupling between the driving shaft and the stamping roller.

The whole device as now described will be seen to be very simple in construction and in operation it has the advantage, as compared with known devices, that the parts make very small movements thereby enabling the machine to work exactly, even when it runs very fast.

Claims.

1. In a post-marking machine, having a post marking roller making one revolution for each letter stamped and which is automatically set in motion by the action of the moving letters, the combination with a post marking roller having a discontinuous motion and a driving shaft having a continuous motion, of a spring actuated lever system for automatically stopping and releasing the post marking roller in synchronism with the passing of the letters said lever-system comprising a two-armed stop-lever, one arm of which is so located that it will in one position serve as an abutment against a lug on a part forming one of the members of a clutch serving to connect the roller with the driving shaft, and the other arm of which is by means of a link connected with one end of a feeler lever, the other end of which feeler lever projects into the path of the letters at or near the point where they pass a pair of feeding rollers; said feeler lever having a fulcrum capable of a transverse movement in the longitudinal direction of the feeler, and at or near its fulcrum a lug adapted as a stop to keep the feeler under the action of a spring in a fixed position relatively to the passing letters and also adapted during the swinging movement of the feeler to move the feeler longitudinally.

2. In a post marking machine, the combination with a stop lever, and a feeler capable of a swinging and of a longitudinal motion, of an auxiliary guide for the feeler, consisting of an arm the end of which, when the feeler is in its withdrawn position is adapted to abut against the side of an end of said feeler which is connected by a link with the stop lever, in such a manner that the swinging movement of the feeler is thereby prevented in case a letter containing an object which might exert back-pressure on the end of the feeler in contact with the letter, enters the machine.

3. In a post marking machine, the combination with a stop-lever, of a clutch member capable of a rotary motion relatively to the stamping roller shaft and of an axial motion relatively to the same; said stop lever having near its end a shoulder, and beyond said shoulder, a projection with a sloping surface, said surface being of a sufficient size to displace the clutch-member axially the moment before the cooperating lug on the said clutch member abuts against the shoulder on said stop lever, by which axial movement the clutch is released.

4. In a post marking machine, a clutch device comprising a toothed flange on a continuously rotating stamping roller shaft; and a clutch member co-operating with a stop lever, said clutch member having on one end teeth corresponding with the teeth of said flange and having on the other end, wedge or helically shaped teeth co-operating with similar teeth on an end face of said stamping roller shaft, the total axial length of said movable clutch member from tip of the teeth on one end to tip of the teeth on the other end being so much less than the free distance from the root of the teeth on the flange to the root of the teeth on the roller face that when the said clutch member is moved towards the roller face, the clutch teeth on the other face are out of engagement with each other, and being of such an axial extension that the clutch member cannot be turned relatively to the stamping roller by so much as the peripheral length of the wedge teeth on the face of the same.

In testimony that I claim the foregoing as my invention, I have signed my name.

GUSTAV ADOLF HANSEN.